(12) United States Patent
Ogawa

(10) Patent No.: US 9,855,942 B2
(45) Date of Patent: Jan. 2, 2018

(54) MOVING ASSIST APPARATUS AND METHOD AND DRIVING ASSIST SYSTEM

(71) Applicant: TOYOTA JIDOSHA KABUSHIKI KAISHA, Toyota-shi (JP)

(72) Inventor: Yuki Ogawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/120,947

(22) PCT Filed: Feb. 3, 2015

(86) PCT No.: PCT/IB2015/000103
§ 371 (c)(1),
(2) Date: Aug. 23, 2016

(87) PCT Pub. No.: WO2015/124979
PCT Pub. Date: Aug. 27, 2015

(65) Prior Publication Data
US 2016/0362098 A1    Dec. 15, 2016

(30) Foreign Application Priority Data
Feb. 24, 2014    (JP) ................................. 2014-033464

(51) Int. Cl.
*B60W 20/12*    (2016.01)
*B60W 50/00*    (2006.01)
(Continued)

(52) U.S. Cl.
CPC ............ *B60W 20/12* (2016.01); *B60W 10/06* (2013.01); *B60W 10/08* (2013.01); *B60W 10/26* (2013.01);
(Continued)

(58) Field of Classification Search
USPC ........................................................ 701/22
See application file for complete search history.

(56) References Cited

U.S. PATENT DOCUMENTS

| 9,014,900 B2 * | 4/2015 | Hokoi | B60W 20/40 |
| | | | 180/65.265 |
| 2009/0259354 A1 * | 10/2009 | Krupadanam | B60W 10/06 |
| | | | 701/22 |

(Continued)

FOREIGN PATENT DOCUMENTS

| JP | 2007-50888 A | 3/2007 |
| JP | 2009-12605 A | 1/2009 |

(Continued)

OTHER PUBLICATIONS

International Search Report dated Apr. 16, 2015, in PCT/IB2015/000103 filed Feb. 3, 2015.

*Primary Examiner* — Krishnan Ramesh
(74) *Attorney, Agent, or Firm* — Oblon, McClelland, Maier & Neustadt, L.L.P.

(57) ABSTRACT

A moving assist apparatus assists a vehicle which includes an internal combustion engine and an electric motor as a driving source to move from a current position to a destination. The moving assist apparatus includes a planning unit configured to, for each section obtained by dividing a traveling route from the current position to the destination, plan one traveling mode from a mode of not maintaining a charge storage amount of a battery and a HV mode of maintaining the charge storage amount of the battery, based on a traveling load associated with the section. The planning unit is configured to replan the traveling mode under a predetermined condition, and when the predetermined condition is satisfied, when a remaining distance of the section
(Continued)

on which the vehicle is traveling is less than a threshold a, to replan a current 'traveling mode to be the traveling mode in priority.

6 Claims, 5 Drawing Sheets

(51) Int. Cl.
 *B60W 10/06* (2006.01)
 *B60W 10/08* (2006.01)
 *B60W 10/26* (2006.01)
(52) U.S. Cl.
 CPC ... *B60W 50/0097* (2013.01); *B60W 2550/402* (2013.01); *B60W 2710/244* (2013.01); *Y02T 10/6291* (2013.01); *Y10S 903/93* (2013.01)

(56) References Cited

U.S. PATENT DOCUMENTS

| | | | | |
|---|---|---|---|---|
| 2010/0131139 | A1* | 5/2010 | Sakai | B60K 6/46 701/22 |
| 2012/0053771 | A1* | 3/2012 | Yoshida | B60L 11/1842 701/22 |
| 2014/0288742 | A1* | 9/2014 | Hokoi | B60W 20/40 701/22 |
| 2015/0066270 | A1* | 3/2015 | Ogawa | G01C 21/3469 701/22 |

FOREIGN PATENT DOCUMENTS

| | | |
|---|---|---|
| JP | 2009-23637 A | 2/2009 |
| JP | 2013-159214 A | 8/2013 |
| JP | 2015-30407 A | 2/2015 |
| KR | 10-2007-0095679 A | 10/2007 |
| WO | WO 2015/019142 A1 | 2/2015 |

* cited by examiner

MOVING ASSIST APPARATUS AND METHOD AND DRIVING ASSIST SYSTEM

BACKGROUND OF THE INVENTION

1. Field of the Invention

The invention relates to a moving assist apparatus and a moving assist method, as well as a driving assist system.

2. Description of Related Art

As a vehicle comprising a plurality of traveling modes, as described above, a hybrid vehicle using an internal combustion engine and an electric motor as a driving source is known. The hybrid vehicle has, as the plurality of traveling modes, a first mode (EV mode) in which EV traveling only using the electric motor and stopping the internal combustion engine while not maintaining a charge storage amount in a battery is given priority; a second mode (HV mode) in which HV traveling using the internal combustion engine and the electric motor while maintaining the charge storage amount in the battery is given priority; and the like. Further, a moving assist apparatus including a navigation system and the like mounted on the hybrid vehicle may provide assistance, such as calculating a traveling route from a current position to a destination based on map information, road traffic information and the like and selecting a traveling mode applied to each section of the traveling route. For example, an example of a vehicle control apparatus having such a moving assist function is described in Japanese Patent Application Publication No. JP 2009-12605 (JP 2009-12605).

In the vehicle control apparatus described in JP 2009-12605, an energy balance of the entire traveling route is considered for setting the traveling mode of each section of the traveling route such that a remaining amount of the battery that is a secondary battery becomes zero at the destination. However, if the traveling mode is reset halfway in a traveling section, that is, the traveling mode is replanned, a driver may feel discomfort when the traveling mode is changed halfway in the traveling section according to the remaining amount of the battery and the energy balance.

In addition, this issue is a common problem in the apparatus and method of allocating traveling modes to a target vehicle including a plurality of traveling modes of different energy balances.

SUMMARY OF THE INVENTION

Therefore, there is provided a moving assist apparatus and a moving assist method, which can suppress discomfort caused by replanning of a traveling mode and facilitate optimization of switching of the traveling mode for a section set in a traveling route, as well as a driving assist system having these moving assist functions.

According to a first aspect of the invention, there is provided a moving assist apparatus for assisting a vehicle which includes an internal combustion engine and an electric motor as a driving source to move from a current position to a destination. The moving assist apparatus includes a planning unit configured to, for each section obtained by dividing a traveling route from the current position to the destination, plan one traveling mode from a first mode of not maintaining a charge storage amount of a battery and a second mode of maintaining the charge storage amount of the battery, based on a traveling load associated with the section, wherein, the planning unit is configured to replan the traveling mode under a predetermined condition, and when the predetermined condition is satisfied, when a remaining distance or a remaining time of the section on which the vehicle is traveling is less than a respective threshold, to replan a current traveling mode to be the traveling mode in priority.

According to a second aspect of the invention, there is provided a moving assist method for assisting a vehicle which includes an internal combustion engine and an electric motor as a driving source to move from a current position to a destination using an electronic control unit. The moving assist method includes, for each section obtained by dividing a traveling route from the current position to the destination, planning, by the electronic control unit, one traveling mode from a first mode of not maintaining a charge storage amount of a battery and a second mode of maintaining the charge storage amount of the battery, based on a traveling load associated with the section, and replanning the traveling mode under a predetermined condition, wherein, if a remaining distance or a remaining time of the section on which the vehicle is traveling is less than a respective threshold while the predetermined condition is satisfied, a current traveling mode is replanned to be the traveling mode in priority.

According to the above aspects, if the remaining distance or the remaining time of the section on which the vehicle is traveling is less than a respective threshold while the traveling mode is replanned during the vehicle traveling, the current traveling mode is replanned to the traveling mode in priority. That is, when the replanning is performed halfway in a traveling section, depending on a remaining amount of the battery and energy balance, there is a possibility that the traveling mode of the section on which the vehicle is traveling is changed, but such change of traveling mode can be suppressed. Thus, the discomfort due to the replanning of the traveling mode may be suppressed, and optimization of switching of the traveling mode for the section set in the traveling route may be facilitated.

In the above first aspect, when replanning the traveling mode, the planning unit may set an assumed traveling load that is smaller than the traveling load of each section as the traveling load of the section on which the vehicle is traveling if the current traveling mode of the vehicle is the first mode, and set an assumed traveling load that is larger than the traveling load of each section as the traveling load of the section on which the vehicle is traveling if the current traveling mode of the vehicle is the second mode, plan the traveling mode of the section having a relatively small traveling load including the assumed traveling load to be the first mode, and plan the traveling mode of the remaining section to be the second mode.

In the above second aspect, when the traveling mode is replanned, an assumed traveling load that is smaller than the traveling load of each section may be set as the traveling load of the section on which the vehicle is traveling when the current traveling mode of the vehicle is the first mode, an assumed traveling load that is larger than the traveling load of each section may be set as the traveling load of the section on which the vehicle is traveling when the current traveling mode of the vehicle is the second mode, the traveling mode of the section having a relatively small traveling load including the assumed traveling load is planned to be the first mode, and the traveling mode of the remaining section is planned to be the second mode.

In the above aspects, an assumed traveling load that is smaller than the traveling load of each section is set as the traveling load of the section on which the vehicle is traveling, when the current traveling mode of the vehicle is the first mode, and an assumed traveling load that is larger than the traveling load of each section is set as the traveling load of the section on which the vehicle is traveling, when the current traveling mode of the vehicle is the second mode. Further, the traveling mode of the sections having a relatively small traveling load that is already set is planned to be the first mode, and the traveling mode of the remaining sections is planned to be the second mode. Therefore, the section the current traveling mode of which is the first mode is planned to be the first mode, and the section the current traveling mode of which is the second mode is planned to be the second mode. Therefore, even if the traveling mode is replanned halfway in the traveling section, suppression of the change of the traveling mode of the section on which the vehicle is traveling is facilitated.

As for the above moving assist apparatus, the predetermined condition may be one of the arrival of a predetermined cycle time and use of the battery for a purpose other than the vehicle traveling.

According to the above aspect, the replanning is performed by taking one of the arrival of the predetermined cycle time and use of the battery for the purpose other than the vehicle traveling as the condition. That is, by performing the replanning when the predetermined cycle time arrives, it is possible to facilitate optimization of the traveling mode of each section of the traveling route periodically. Further, when the battery is used for the purpose other than the vehicle traveling, the remaining amount of the battery is reduced to be different from plan, and therefore by performing the replanning at this time, it is possible to facilitate optimization of the traveling mode of each section of the traveling route.

According to a third aspect of the invention, there is provided a driving assist system for assisting driving of a vehicle which includes an internal combustion engine and an electric motor as a driving source based on one traveling mode that is selected from a plurality of different traveling modes, wherein the plurality of different traveling modes are traveling modes that are planned for each section obtained by dividing a traveling route of the vehicle from a current position to a destination. The driving assist system includes a moving assist apparatus configured to plan one traveling mode that is selected from the plurality of traveling modes for each section of the traveling route. The moving assist apparatus includes a planning unit configured to, for each section obtained by dividing a traveling route from the current position to the destination, plan one traveling mode from a first mode of not maintaining a charge storage amount of a battery and a second mode of maintaining the charge storage amount of the battery, based on a traveling load associated with the section, wherein the planning unit is configured to replan the traveling mode under a predetermined condition, and if a remaining distance or a remaining time of the section on which the vehicle is traveling is shorter than a respective threshold while the predetermined condition is satisfied, to replan a current traveling mode to be the traveling mode in priority.

According to the above configuration, it is possible for a vehicle including a plurality of traveling modes to suppress the discomfort due to the replanning of the traveling mode, and to facilitate optimization of switching of the traveling mode for the section set in the traveling route while assisting the driving of the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment embodying a moving assist apparatus and a moving assist method as well as a driving assist system will be described below with reference to FIGS. 1 to 4. The moving assist apparatus and the moving assist method as well as the driving assist system according to this embodiment are applied to a hybrid vehicle using an electric motor having a battery consisting of a secondary battery as a power source and an internal combustion engine having gasoline and other fuel as a power source as a driving source.

Figure 1:
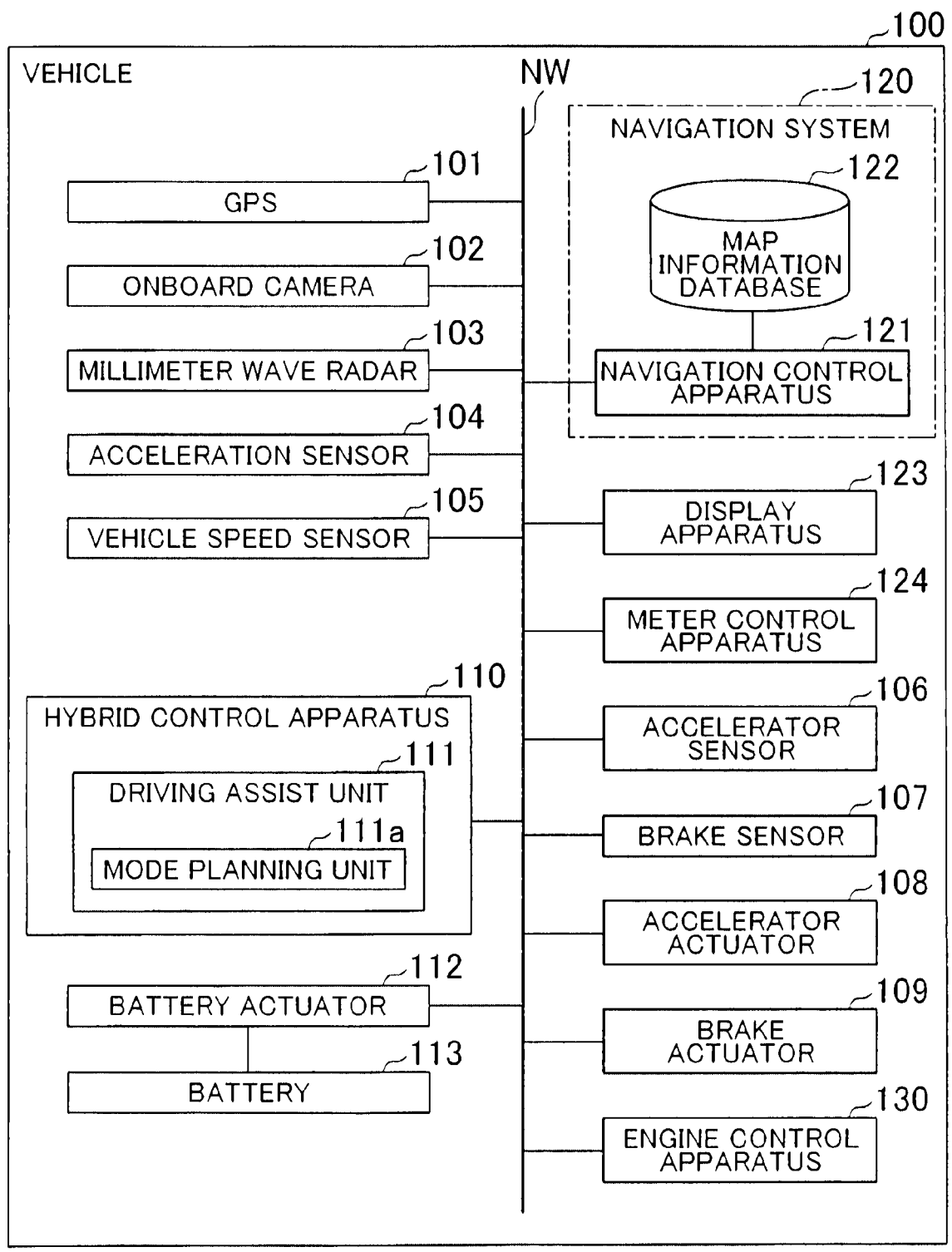
FIG. 1 is a block diagram showing a schematic structure of an embodiment of a moving assist apparatus.

As shown in FIG. 1, a vehicle 100 is provided with, as an apparatus for detecting a traveling state of the vehicle 100, for example, a GPS (Global Positioning System) 101, an onboard camera 102, a millimeter wave radar 103, an acceleration sensor 104, a vehicle speed sensor 105, and the like. The GPS 101, the onboard camera 102, the millimeter wave radar 103, the acceleration sensor 104 and the vehicle speed sensor 105 are connected to a hybrid control apparatus 110, a navigation control apparatus 121 of a navigation system 120 and an engine control apparatus 130, for example, via an onboard network NW such as a CAN (Controller Area Network). Further, the hybrid control apparatus 110, the navigation control apparatus 121 and the engine control apparatus 130 are a so-called ECU (Electronic Control Unit) configured to include a small computer having a computing apparatus and a storage apparatus. The hybrid control apparatus 110, the navigation control apparatus 121 and the engine control apparatus 130 are able to perform various controls by operating the programs and parameters stored in the storage apparatus by the computing apparatus.

The GPS 101 receives a signal from a GPS satellite, and detects a position of the vehicle 100 such as latitude and longitude based on the signal received from the GPS satellite. Further, the GPS 101 outputs information indicating the detected position (latitude and longitude) of the vehicle 100, that is position information. The onboard camera 102 captures an image of surrounding environment of the vehicle 100 and outputs image data obtained by the imaging. The millimeter-wave radar 103 detects an object that is present around the vehicle 100 by using a radio wave in the millimeter wave band, and outputs a signal corresponding to the detection result.

The acceleration sensor 104 detects an acceleration of the vehicle 100 and outputs a signal corresponding to the detected acceleration. The vehicle speed sensor 105 detects a rotating speed of a wheel of the vehicle 100 and outputs a signal corresponding to the detected rotating speed.

An accelerator sensor 106 detects an operation amount by the driver to an accelerator pedal, and outputs a signal corresponding to the detected operation amount to the accelerator pedal. A brake sensor 107 detects an operation amount by the driver to a brake pedal, and outputs a signal corresponding to the detected operation amount to the brake pedal.

Further, the vehicle 100 is provided with an accelerator actuator 108 for controlling a driving state of the internal combustion engine and a brake actuator 109 for controlling a brake. The accelerator actuator 108 and the brake actuator 109 are electrically connected to the onboard network NW. The accelerator actuator 108 controls the internal combustion engine based on a control amount of the internal combustion engine that is calculated by the engine control apparatus 130 according to a detected value of the accelerator sensor 106. Further, the brake actuator 109 controls the brake based on a control amount of the brake that is calculated by the engine control apparatus 130 according to a detected value of the brake sensor 107.

Further, the vehicle 100 is provide with a battery 113 that is a power source of the electric motor as the driving source, and a battery actuator 112 for controlling charging and discharging of the battery 113. The battery actuator 112 is electrically connected to the onboard network NW. The battery actuator 112 manages the charging and discharging of the battery 113 and the like. Further, the battery actuator 112 drives the electric motor by controlling the discharging of the battery 113, or charges the battery 113 by a regeneration of the electric motor.

The vehicle 100 is provided with the hybrid control apparatus 110 for controlling driving states of the internal combustion engine and the electric motor. The hybrid control apparatus 110 is electrically connected to the battery actuator 112, the accelerator actuator 108 and the brake actuator 109 via the onboard network NW.

The hybrid control apparatus 110 determines a distribution of a driving force (output ratio) of the internal combustion engine and the electric motor based on the detection results of the acceleration sensor 104, the vehicle speed sensor 105 and the accelerator sensor 106. In particular, the hybrid control apparatus 110 adjusts an energy remaining amount of the battery 113 that is a remaining amount of the battery 113 according to a variation of the distribution of the driving force (output ratio) of the internal combustion engine and the electric motor. The hybrid control apparatus 110 performs an EV traveling of using the electric motor as the driving source and stopping the internal combustion engine and a HV traveling of using the internal combustion engine and the electric motor as the driving source.

The hybrid control apparatus 110 suitably selects a CD (Charge Depleting) mode that is a mode of consuming a charge storage amount of the battery 113 and a CS (Charge Sustaining) mode that is a mode of maintaining the charge storage amount of the battery 113.

The CD mode is a mode of actively consuming electric power obtained by charging in the battery 113 instead of maintaining the charge storage amount of the battery 113, and is a mode of giving priority to the EV traveling that is achieved by the electric motor 24. Hereinafter this CD mode will be described as an EV mode. Note that, even in the EV mode, if the accelerator pedal is largely depressed for a large traveling power, the internal combustion engine is driven.

The CS mode is a mode of maintaining the charge storage amount of the battery 113 in a predetermined range with respect to a reference value, and is a mode of giving priority to the HV traveling of driving the internal combustion engine and enabling a regeneration operation of the electric motor as required in order to maintain the charge storage amount. Hereinafter this CS mode will be described as an HV mode. Note that, even in the HV mode, if the charge storage amount of the battery 113 is above the reference value, the internal combustion engine is stopped. The reference value of the HV mode is suitably set as a value of the charge storage amount when it is changed from the EV mode to the HV mode, or a value of the charge storage amount required for maintaining performance of the battery 113.

In the selected EV mode or HV mode, the hybrid control apparatus 110, based on the distribution of the driving force, generates a control command of the battery actuator 112 related to the discharging of the battery 113 or the like and information related to a control amount of the internal combustion engine that is calculated by the engine control apparatus 130. Further, the hybrid control apparatus 110 determines a distribution of a braking force of the brake and the electric motor based on the detection results of the acceleration sensor 104, the vehicle speed sensor 105, and the brake sensor 107. The hybrid control apparatus 110, based on the distribution of the braking force, generates a control command of the battery actuator 112 related to the charging of the battery 113 or the like and information related to a control amount of the brake that is calculated by the engine control apparatus 130. That is, the hybrid control apparatus 110 controls the charging and discharging of the battery 113 by outputting the generated control command to the battery actuator 112. Thus, the electric motor using the battery 113 as the power source (power supply) is driven by the discharging of the battery 113, or the battery 113 is charged by the regeneration of the electric motor. Further, the hybrid control apparatus 110 is capable of monitoring an executing state of the hybrid control and a charging rate of the battery 113.

The hybrid control apparatus 110 switches control between the EV mode and the HV mode according to the selection result of the driver of the vehicle 100. Further, the hybrid control apparatus 110 has a function of switching between the EV mode and HV mode automatically, to perform the control of switching between the EV mode and the HV mode based on information related to a traveling load required for traveling in each section of a traveling route of the vehicle 100 that is input from the navigation control apparatus 121 and the like. Note that, the traveling load is a load per unit distance in the section, and is an average load amount required for traveling in the section. On the other hand, an accumulated value of the traveling load required to finish the section is defined as energy consumption.

Further, the vehicle 100 is provided with a map information database 122 in which map data is registered. The map data is data related to geography such as roads. Data that can indicate an indication type of geography and the like and information related to a position such as latitude and longitude is registered in the map data. The data of indication type includes indication information such as a river, a lake, and the sea. Further, information such as intersection names, road names, district names, direction guide, and facility information may be registered in the map data.

Further, the map information database 122 includes node data that is information related to a node indicating a position on a road, and link data that is information related to a link as a section between two nodes. The node on the road is set as a position of particular traffic element such as an intersection, a traffic light and a curve, a position where the number of lanes is changed and the like. The node data includes position information of the node, road information of this position and the like. The link is set as a section between two nodes and delimited by the two nodes. The link data includes information of the two nodes, road information of the link section and the like. The traveling load may be obtained or calculated from traveling load information included in the link data. Information such as a start point position, an end point position, a distance, a route, an undulation is included as the road information of the link section. Further, the link data includes various types of data such as cost data including the traveling load of the link section, road data including a road type, mark data indicating a particular position, intersection data indicating intersection information and facility data indicating the facility information.

In detail, the node data is configured of an identification number of the node that is a node ID, coordinates of the node, link IDs of all the links that are connected to the node, a node type indicating a type such as an intersection or an confluence point and the like, for example. Further, the node data may be configured to include data indicating an identification number of an image of the node that is an image ID and the like for indicating characteristics of the node and the like.

Further, the link data is configured of an identification number of the link that is a link ID, a link length, the node ID of each node connected to the start and end points, for example. Further, except for the data indicating the road type such as a highway, a toll road, a general road, an urban/suburban road, a mountainous area road, a tunnel, a bridge, and a three-dimensional crossing road, the link data is configured to include necessary information out of the data indicating a road width, the number of lanes, a link traveling time, a legal speed limit, a road slope and the like. In addition, the link data may be configured to include data indicating an average value, a maximum value, a minimum value or the like of a traveling time, a moving speed, fuel consumption, power consumption and the like, as necessary output of the vehicle 100 in each link that is the traveling load information. The power consumption is an amount of electric power consumed by the electric motor when the vehicle 100 travels in the EV mode. The traveling load of the link (section) is obtained or calculated based on such traveling load information. Note that, the traveling load is an average value over the link (section), and its unit is set to [kW] or the like. Further, the energy consumption as an accumulated value of the traveling load required to finish each link (section) may be calculated from the traveling load and the link length (section length).

The vehicle 100 is provided with the navigation system 120 for performing a route guidance and the like. The navigation control apparatus 121 of the navigation system 120 obtains a current position (latitude and longitude) of the vehicle 100 from the GPS 101. Further, the navigation control apparatus 121 determines a destination point (latitude and longitude) if the driver sets the destination point. Then, the navigation control apparatus 121 searches a traveling route from the current position of the vehicle 100 to the destination point by referring to the map information database 122 and using a Dijkstra algorithm, for example. Further, the navigation control apparatus 121 calculates the traveling load, a moving time, a moving speed, the fuel consumption, and the power consumption in the searched traveling route, for example. Then, the navigation control apparatus 121 outputs the searched traveling route and information indicating the calculated traveling load, moving time, moving speed, fuel consumption, and power consumption to the hybrid control apparatus 110 via the onboard network NW, and to a display apparatus 123 configured of a liquid crystal display or the like that is provided inside the vehicle via the onboard network NW.

Further, the vehicle 100 is provided with a meter control apparatus 124 for controlling a displaying state of a meter displayed on an instrument panel that is provided on a dashboard. The meter control apparatus 124 obtains for example, data indicating a charging and discharging state of the battery 113 from the hybrid control apparatus 110, and visually displays for example, an energy flow of the vehicle 100 based on the obtained data. The energy flow refers to a flow of energy in the vehicle 100 caused by the charging and discharging of the battery 113, the driving force/regeneration of the electric motor and the like. In addition, the energy flow may include a flow of energy in the vehicle 100 caused by the driving force of the internal combustion engine and the like.

The hybrid control apparatus 110 allocates a traveling mode for each section of the traveling route if the traveling route is input. The hybrid control apparatus 110 is provided with a driving assist unit 111 for assisting the allocation of traveling mode corresponding to the traveling path. The driving assist unit 111 obtains from the navigation control apparatus 121 information on the traveling route to the destination point set by the driver. Further, the driving assist unit 111 is provided with a mode planning unit 111a for planning the traveling mode that is allocated to the section of the obtained traveling route. The mode planning unit 111a constitutes the moving assist apparatus, and functions by executing a program in the hybrid control apparatus 110. The mode planning unit 111a has a function of planning the traveling mode for each section depending on the traveling load of each section of the traveling path by considering an energy balance of the entire traveling route.

In general, there is a trend that the efficiency is better by traveling through the section of a small traveling load with the electric motor, and that the efficiency is better by traveling through the section of a large traveling load with the internal combustion engine. Therefore, the hybrid control apparatus 110 allocates the EV mode to the section of a small traveling load and the HV mode to the section of a large traveling load.

The mode planning unit 111a compares the traveling loads in a plurality of target sections to allocate the EV mode sequentially from the section of a small traveling load. Further, the mode planning unit 111a accumulates the energy consumption of the section to which the EV mode is allocated, and subtracts it from an energy remaining amount of the battery 113. Then, the mode planning unit 111a continues to allocate the EV mode to each section such that the accumulated energy consumption does not exceed the energy remaining amount of the battery 113. Thus, the mode planning unit 111a allocates the EV mode to the section of a relatively small traveling load out of the sections of the traveling route. The mode planning unit 111a allocates the HV mode to the section to which the EV mode is not allocated.

Meanwhile, the mode planning unit 111a plans the traveling mode for each section of the traveling route by considering the energy balance of the entire traveling route such that the remaining amount of the battery 113 becomes zero at the destination. However, when the traveling mode is replanned halfway in a traveling section, when the traveling mode is changed halfway in the section being traveled depending on the remaining amount of a battery 113 and the energy balance, the driver may feel discomfort. Therefore, when a remaining distance of the section on which the vehicle is traveling is less than a predetermined threshold, the mode planning unit 111a replans a current traveling mode to be the traveling mode in priority against the traveling mode other than the current traveling mode.

That is, when the remaining distance of the section on which the vehicle is traveling is less than the predetermined threshold, the mode planning unit 111a replans the traveling mode to be the HV mode during the vehicle 100 is traveling with the HV mode, and replans the traveling mode to be the EV mode during the vehicle 100 is traveling with the EV mode. Thus, it is possible to suppress discomfort caused by replanning of the traveling mode and facilitate optimization of switching of the traveling mode for the section set in the traveling route. The threshold α is determined by at least one of the following.

It is a distance corresponding to a display size (width) by which the driver can recognize visually the traveling mode of each section when the traveling mode of each section is displayed on the display apparatus 123. • It is a distance derived from the time required for updating a display of a plan of the traveling mode.

It is a distance that is changed according to the vehicle speed (becomes longer when the vehicle speed is high, and becomes shorter when the vehicle speed is low). The mode planning unit 111a also outputs the traveling mode that is planned for each section of the traveling route as described above to the display apparatus 123, and displays the planned traveling mode for the section being traveled on the display apparatus 123.

The hybrid control apparatus 110 determines the section on which the vehicle is traveling that is a current section by suitably obtaining information on the position being traveled, and causes the vehicle 100 to travel in the determined section with the planned traveling mode. That is, every time the traveling route of the vehicle 100 is changed, the hybrid control apparatus 110 switches the traveling mode of the vehicle 100 to the EV mode or the HV mode that is allocated to the section. Thus, the vehicle 100 travels in the section on which the vehicle is traveling (current section) with the planned traveling mode.

Figure 2:
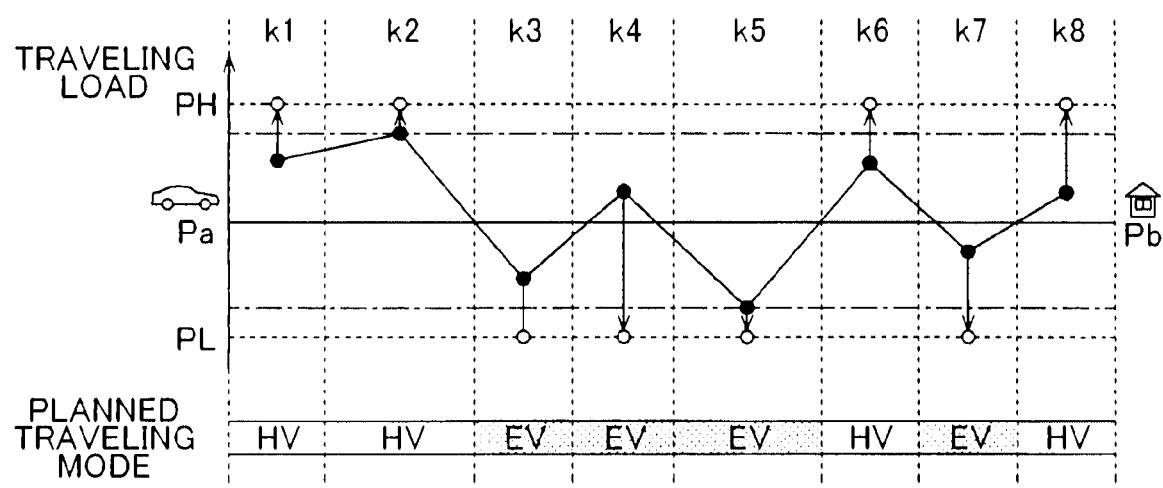
FIG. 2 is a diagram illustrating a setting mode of an assumed traveling load for each section of a traveling route of which a traveling mode is planned by the moving assist apparatus of the embodiment.

For example, as shown in FIG. 2, when the traveling route is from the current position Pa to the destination point Pb, the traveling route searched by the navigation system 120 includes sections of the first section k1 to the eighth section k8. Further, information related to the traveling load, the energy consumption and the like in each section of the first section k1 to the eighth section k8 is obtained from the map information database 122. Note that, FIG. 2 is a graph showing an average value of the traveling load when the vehicle 100 travels in each section of the traveling route. Moreover, the vehicle 100 travels according to the traveling mode of each section that is planned based on the energy consumption and the traveling load of each section of the traveling route.

On the other hand, as also shown in FIG. 2, when the replanning is performed during the vehicle 100 is traveling in each section of the traveling route, an assumed traveling load is set as the traveling load of the section being traveled based on the planned traveling load. That is, when the planned traveling mode of the section being traveled is the HV mode, an assumed high traveling load PH that is higher than the traveling load of each section is set. On the other hand, when the planned traveling mode of the section being traveled is the EV mode, an assumed low traveling load PL that is lower than the traveling load of each section is set. In this way, even if the replanning is performed, the traveling mode of the section being traveled is the same traveling mode as that before the replanning.

Next, with reference to FIGS. 3 and 4, a planning process of the traveling mode and effect thereof that is implemented by the mode planning unit 111a of the driving assist unit 111 will be described. The driving assist unit 111 plans the traveling mode for each section of the traveling route every time the traveling route is transmitted from the navigation control apparatus 121. Further, the mode planning unit 111a performs a replanning of the traveling mode for each planned cycle.

Figure 3:
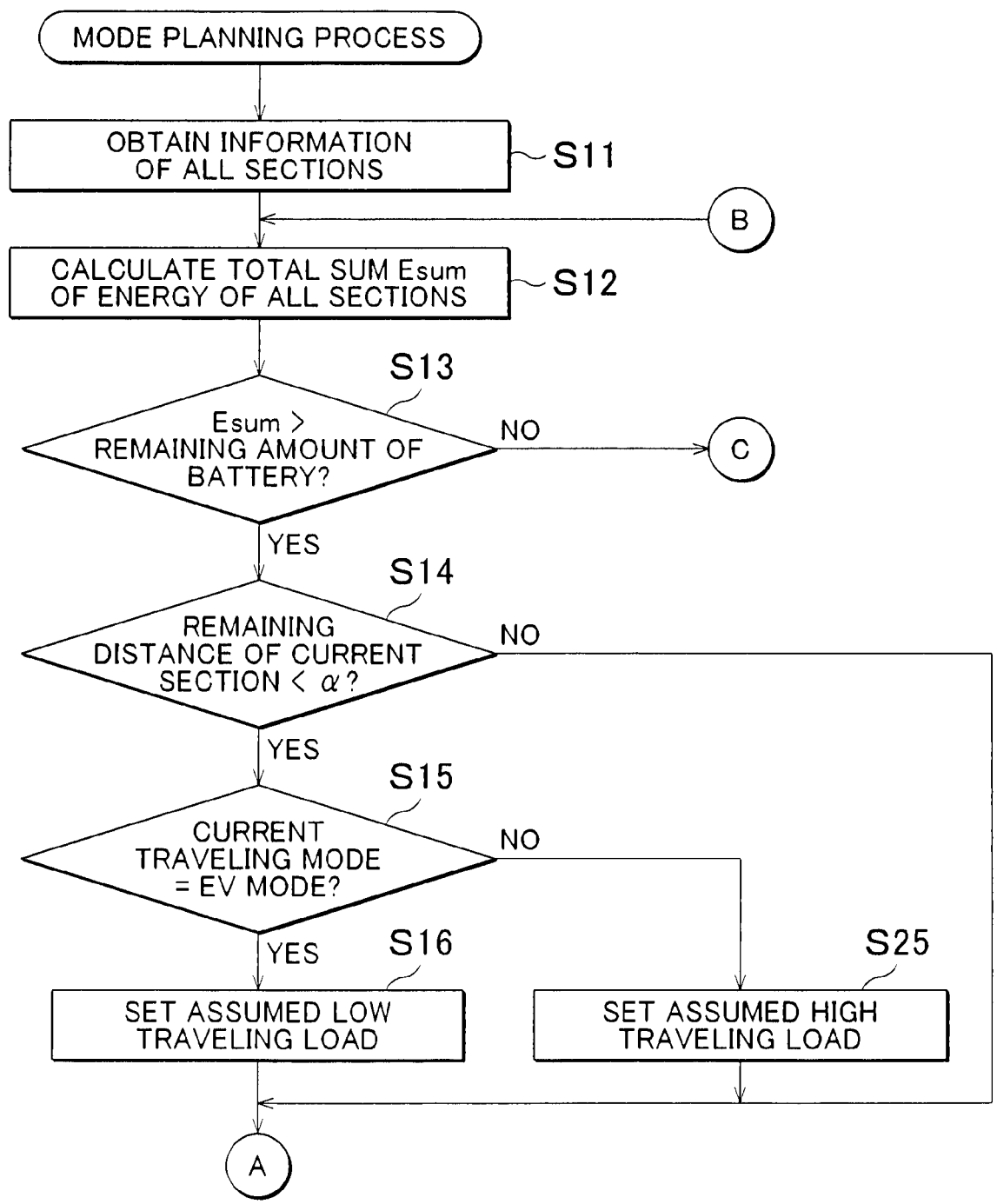
FIG. 3 is a flowchart illustrating processing steps of a planning process of the traveling mode by the moving assist apparatus of the embodiment.
Figure 4:
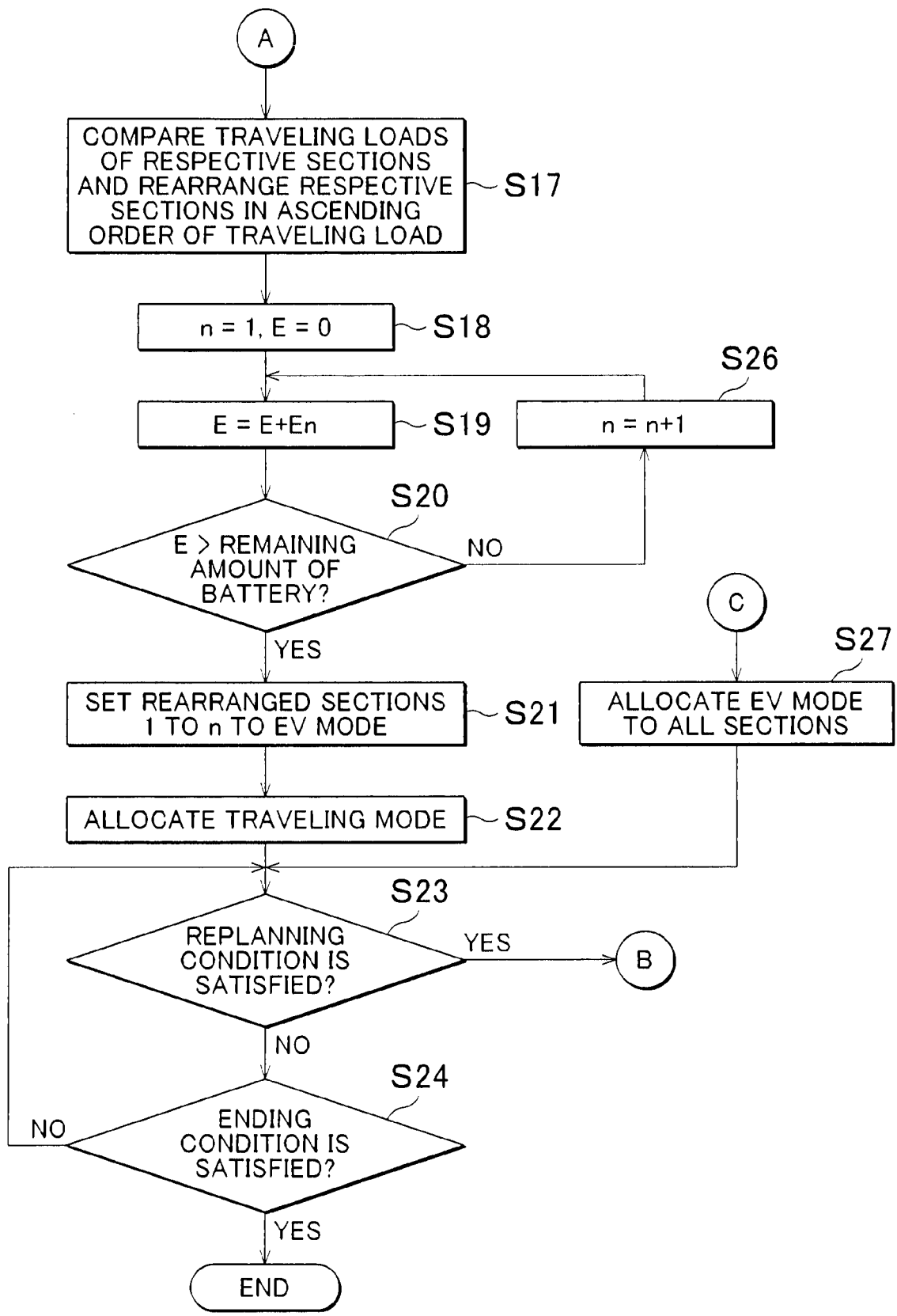
FIG. 4 is a flowchart illustrating processing steps of the planning process of the traveling mode by the moving assist apparatus of the embodiment.

As shown in FIGS. 3 and 4, the driving assist unit 111 obtains route information for all sections of the traveling route if the destination point Pb (FIG. 2) is set by the navigation control apparatus 121 (Step S11).

The driving assist unit 111 then calculates a total sum of energy consumption Esum of all sections of the traveling route (Step S12), and then determines whether the sum of energy consumption Esum of all sections of the traveling path is greater than the remaining amount of the battery 113 (Step S13). That is, the mode planning unit 111a determines whether it is possible to travel in all sections of the traveling path with the EV mode. When it is determined that the sum of energy consumption Esum of all sections of the traveling path is not greater than the remaining amount of the battery 113 (Step S13: NO), the driving assist unit 111 allocates the EV mode to all sections of the traveling route (Step S27).

On the other hand, when it is determined that the sum of energy consumption Esum of all sections of the traveling path is greater than the remaining amount of the battery 113 (Step S13: YES), the driving assist unit 111 determines whether the remaining distance of the section on which the vehicle is traveling that is a distance to the next section is less than the predetermined threshold α (Step S14). This is used for preventing the mode planning unit 111a from changing the traveling mode in a state where there is only a little distance remaining in the current section. When the driving assist unit 111 determines that the remaining distance of the section on which the vehicle is traveling is not less than the predetermined threshold α (Step S14: NO), the process proceeds to step S17.

On the other hand, when it is determined that the remaining distance of the section on which the vehicle is traveling is less than the predetermined threshold α (Step S14: YES), the driving assist unit 111 determines whether the current traveling mode is the EV mode (Step S15). That is, in this case, the mode planning unit 111a determines whether the current traveling mode is the EV mode or the HV mode. Then, as shown in FIG. 2, when it is determined that the current traveling mode is the HV mode instead of the EV mode (Step S15: NO), the driving assist unit 111 sets the assumed high traveling load PH (Step S25). The assumed high traveling load PH is an assumed traveling load that is greater than the traveling load of each section. On the other hand, when it is determined that the current traveling mode is the EV mode (Step S15: YES), the driving assist unit 111 sets the assumed low traveling load PL (Step S16). The assumed low traveling load PL is an assumed traveling load that is smaller than the traveling load of each section.

Next, the driving assist unit 111 compares the traveling loads of respective sections of the traveling path, and rearranges the respective sections in an ascending order of traveling load (Step S17). That is, the mode planning unit 111a compares the traveling load including the above described assumed high traveling load PH or assumed low traveling load PL.

The driving assist unit 111 sets the section that is rearranged in the ascending order of traveling load as section n=1 to n, the section n=1, and the energy consumption E=0 (Step S18). The driving assist unit 111 calculates the sum of the energy consumption up to the section n (E=E+En) (Step S19). Note that, the energy consumption of the section on which the vehicle is traveling is not the energy consumption based on the assumed traveling load, but employs an energy consumption that is calculated based on the traveling load obtained from the map information database 122. The assumed traveling load is used only for rearranging the sections based on the traveling load.

Next, the driving assist unit 111 determines whether the sum of the energy consumption E of the sections up to the section n is greater than the remaining amount of the battery 113 (Step S20). When it is determined that the sum of the energy consumption E of the sections up to the section n is not greater than the remaining amount of the battery 113 (Step S20: NO), the driving assist unit 111 sets n=n+1 for adding a single section (Step S26).

On the other hand, when it is determined that the sum of the energy consumption E of the sections up to the section n is greater than the remaining amount of the battery 113 (Step S20: YES), the driving assist unit 111 sets the rearranged sections 1 to n to the EV mode (Step S21). Then the driving assist unit 111 allocates the traveling mode to each section of the traveling route (Step S22).

Next, the driving assist unit 111 determines whether a replanning condition is satisfied (Step S23). That is, the mode planning unit 111a takes one of the arrival of a predetermined cycle time and use of the battery 113 for a purpose other than the vehicle traveling as a condition to determine whether the condition is satisfied. Then, when the driving assist unit 111 determines that the replanning condition is satisfied (Step S23: YES), the process proceeds to step S12 to perform the replanning of the traveling mode.

On the other hand, when it is determined that the replanning condition is not satisfied (Step S23: NO), the driving assist unit 111 determines whether an ending condition is satisfied (Step S23). That is, the mode planning unit 111a determines whether the ending condition such as that the remaining amount of the battery 113 becomes very little is satisfied. Moreover, if there is a residual amount remained in the battery 113, the driving assist unit 111 determines that the ending condition is not satisfied (Step S24: NO), and the process proceeds to step S23. On the other hand, if there is only a little remaining amount in the battery 113, the driving assist unit 111 determines that the ending condition is satisfied (Step S24: YES), and ends the mode planning process.

In this embodiment, when the remaining distance of the on which the vehicle is traveling is less than the threshold α, the traveling mode is replanned to be the HV mode during the vehicle 100 is traveling with the HV mode, and to be the EV mode during the vehicle 100 is traveling with the EV mode. Thus, it is possible to suppress discomfort caused by replanning of the traveling mode and facilitate optimization of switching of the traveling mode for the section set in the traveling route.

As described above, according to this embodiment, it is possible to achieve the following effects. (1) When the traveling mode is replanned during the vehicle 100 traveling, when the remaining distance of the section on which the vehicle is traveling 100 is less than the threshold α, the current traveling mode is replanned to the traveling mode in priority against the traveling mode other than the current traveling mode. Therefore, when the replanning is performed halfway in the traveling section, it is possible to suppress change of traveling mode in the section on which the vehicle is traveling depending on the remaining amount of the battery 113 and the energy balance. Thus, the discomfort due to the replanning of the traveling mode may be suppressed, and optimization of switching of the traveling mode for the section set in the traveling route may be facilitated.

(2) When the current traveling mode of the vehicle 100 is the EV mode, the assumed low traveling load PL that is lower than the traveling load of each section is set as the traveling mode of the section on which the vehicle is traveling, and when the current traveling mode of the vehicle 100 is the HV mode, an assumed high traveling load PH that is higher than the traveling load of each section is set as the traveling mode of the section on which the vehicle is traveling. Moreover, the traveling mode of the section of a relatively small traveling load that is already set is planed to be the EV mode, and the traveling mode of the other season is planed to be the HV mode. Therefore, the section the current traveling mode of which is the EV mode is planned to be EV mode, and the section the current traveling mode of which is the HV mode is planned to be HV mode. Therefore, even if the replanning is performed halfway in the traveling section, it is possible to suppress the change of traveling mode in the section on which the vehicle is traveling.

(3) The replanning is performed by taking one of the arrival of the predetermined cycle time and use of the battery 113 for the purpose other than the vehicle traveling as the condition. That is, by performing the replanning when the predetermined cycle time arrives, it is possible to facilitate optimization of the traveling mode of each section of the traveling route periodically. Further, when the battery 113 is used for the purpose other than the vehicle traveling, the remaining amount of the battery is reduced to be different from plan, and therefore by performing the replanning at this time, it is possible to facilitate optimization of the traveling mode of each section of the traveling route.

Figure 5:
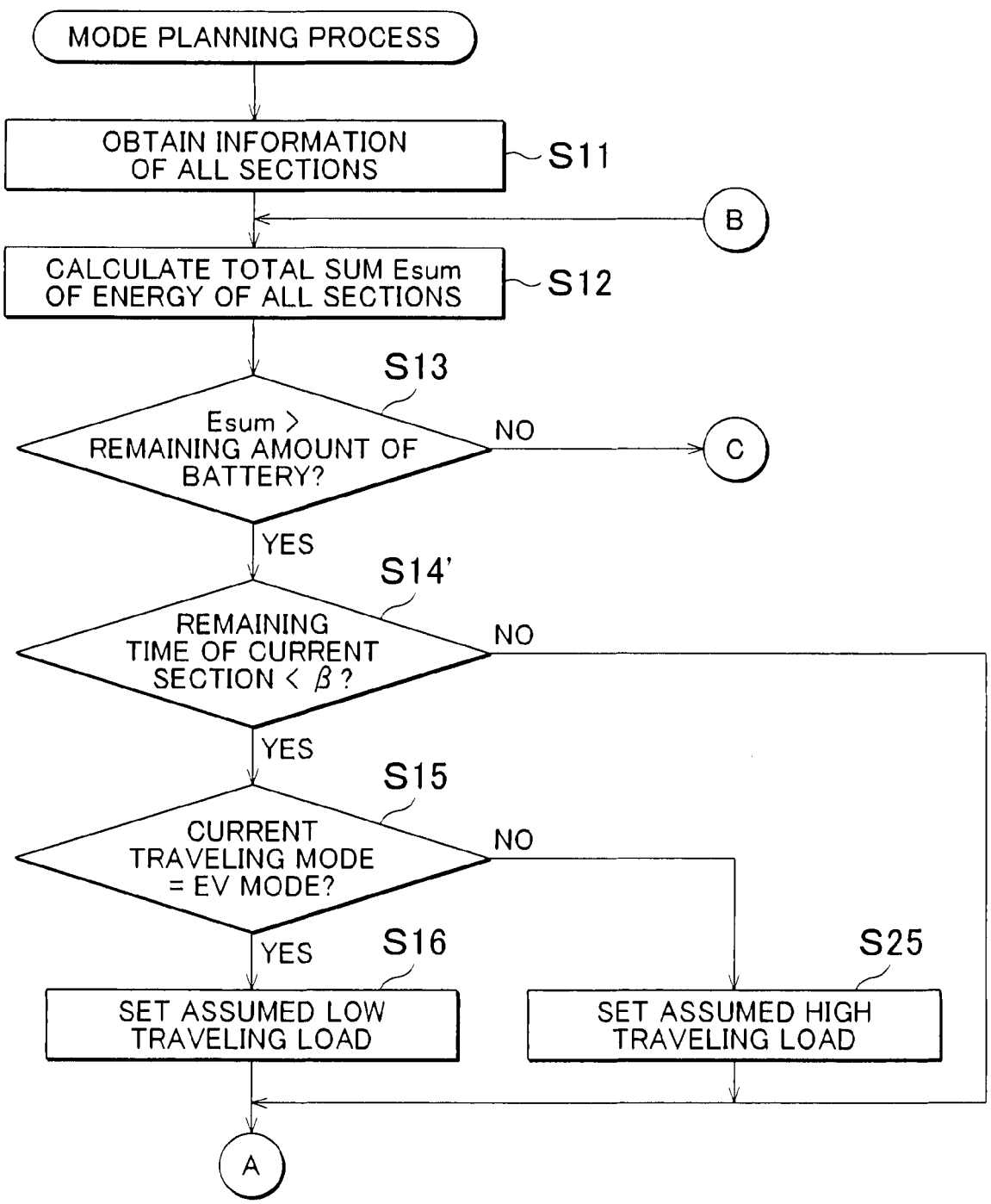
FIG. 5 is a flowchart illustrating processing steps of a variation of the planning process of the traveling mode by the moving assist apparatus.

The above embodiment may be implemented in the following forms that are suitably modified. • In the above embodiment, the condition that the remaining distance of the current section is smaller than the predetermined threshold α (Step S14 in FIG. 3) is employed. However, as shown in FIG. 5, a condition that the remaining time of the current section that is time to the next section is smaller than a predetermined threshold β (Step S14') may also be employed. In this way, even if the remaining distance is short, when traveling in a section in which it needs time to arrive at the next section, it is also possible to suppress the change of traveling mode in the section on which the vehicle is traveling. Thus, it is possible to suppress discomfort caused by replanning of the traveling mode and facilitate optimization of switching of the traveling mode for the section set in the traveling route. Note that the threshold β can also be determined in a manner similar to the previous threshold α.

In the above embodiment, the case where the onboard network NW is a CAN is illustrated. However, the invention is not limited to this, and the onboard network NW may also be configured of other network such as Ethernet (registered trademark), FlexRay (registered trademark) and IEEE1394 (FireWire (registered trademark)), as long as it is communicatively connected to the ECU or the like. Further, it may also be configured of a combination of these networks including the CAN. Thus, for the vehicle using the moving assist apparatus, it is possible to improve design flexibility of the configuration.

In the above embodiment, the GPS 101 is connected to the navigation control apparatus 121 via the onboard network NW. However, the GPS 101 may also be connected directly to the navigation control apparatus 121. • In the above embodiment, the case where the navigation system 120 and the driving assist unit 111 are separately configured is illustrated. However, the invention is not limited to this, and the navigation system and the driving assist unit may be provided in the same apparatus. Thus, it is possible to improve design flexibility of the configuration of the moving assist apparatus.

In the above embodiment, the case where the hybrid control apparatus 110 and the driving assist unit 111 are provided in the same apparatus is illustrated. However, the invention is not limited to this, and the hybrid control apparatus and the driving assist unit may be provided in separate apparatuses. Thus, it is possible to improve design flexibility of the configuration of the moving assist apparatus.

In the above embodiment, the case where respective devices such as the navigation system 120 and the display apparatus 123 are provided integrally on the vehicle 100 is illustrated. However, the invention is not limited to this. The respective devices such as the navigation system and the display apparatus may be communicatively connected to each device, and a portable information processing apparatus such as a mobile phone and a smart phone may be used as all or part of these functions. Thus, it is possible to expand design flexibility of the configuration of the moving assist apparatus.

In the above embodiment, the case where the driving assist unit 111, the navigation system 120, the map information database 122 and the like are provide on the vehicle 100 is illustrated. However, the invention is not limited to this, and some functions of the driving assist unit, the navigation system, the map information database and the like may be provided on an information processing apparatus outside the vehicle or a portable information processing apparatus. An information processing center may be cited as an example of the information processing apparatus outside the vehicle, and the mobile phone, the smart phone or the like may be cited as an example of the portable information processing apparatus. The information processing apparatus outside the vehicle may exchange information over a wireless communication line and the like. The portable information processing apparatus may be connected to the onboard network or be connected through short-range communication, and exchange information via a wireless communication line. Thus, it is possible to expand design flexibility of the configuration of the moving assist apparatus.

In the above embodiment, the case where the traveling load of the section in the traveling route is obtained or calculated from the information included in the map information database is illustrated. However, the invention is not limited to this, and the traveling load of the section in the traveling route may be obtained or calculated from a learning database. For example, if the route has been traveled previously, the traveling load required for the previous traveling of this route that is stored in the learning database may be used. Thus, it is possible to expand design flexibility of the configuration of the moving assist apparatus.

In the above embodiment, the case where the traveling mode is allocated by the driving assist unit 111 is illustrated. However, the invention is not limited to this, and the traveling mode may be allocated by the navigation control apparatus or the like. Thus, it is possible to expand design flexibility of the configuration of the moving assist apparatus.

In the above embodiment, the case where the traveling mode is mainly allocated when the position of the vehicle 100 is the current position Pa is illustrated, but the traveling mode may be allocated at any position during the vehicle moves to the destination point Pb. Moreover, it is possible to perform a suitable allocation of traveling mode to all sections of the traveling route at any position. Thus, it is possible to expand design flexibility of the configuration of the moving assist apparatus.

What is claimed is:

1. A moving assist apparatus for assisting a vehicle which includes an internal combustion engine and an electric motor as a driving source to move from a current position to a destination, the moving assist apparatus comprising:
an electronic control unit configured to, for each section obtained by dividing a traveling route from the current position to the destination, plan one traveling mode from a first mode of not maintaining a charge storage amount of a battery and a second mode of maintaining the charge storage amount of the battery, based on a traveling load associated with the section, wherein
the electronic control unit is configured to replan the traveling mode under a predetermined condition, and if a remaining distance or a remaining time of the section on which the vehicle is traveling is shorter than a respective threshold while the predetermined condition is satisfied, to replan a current traveling mode to be the traveling mode in priority.

2. The moving assist apparatus according to claim 1, wherein when replanning the traveling mode, the electronic control unit is configured to set an assumed traveling load that is smaller than the traveling load of each section as the traveling load of the section on which the vehicle is traveling if the current traveling mode of the vehicle is the first mode, and set an assumed traveling load that is larger than the traveling load of each section as the traveling load of the section on which the vehicle is traveling if the current traveling mode of the vehicle is the second mode, plan the traveling mode of the section having a relatively small traveling load including the assumed traveling load to be the first mode, and plan the traveling mode of the remaining section to be the second mode.

3. The moving assist apparatus according to claim 1, wherein the predetermined condition is one of the arrival of a predetermined cycle time and use of the battery for a purpose other than the vehicle traveling.

4. A moving assist method for assisting a vehicle which includes an internal combustion engine and an electric motor as a driving source to move from a current position to a destination using an electronic control unit, the moving assist method comprising:
for each section obtained by dividing a traveling route from the current position to the destination, planning, by the electronic control unit, one traveling mode from a first mode of not maintaining a charge storage amount of a battery and a second mode of maintaining the charge storage amount of the battery, based on a traveling load associated with the section; and
replanning the traveling mode under a predetermined condition, wherein if a remaining distance or a remaining time of the section on which the vehicle is traveling is less than a respective threshold while the predetermined condition is satisfied, a current traveling mode is replanned to be the traveling mode in priority.

5. The moving assist method according to claim 4, wherein when the traveling mode is replanned, an assumed traveling load that is smaller than the traveling load of each section is set as the traveling load of the section on which the vehicle is traveling when the current traveling mode of the vehicle is the first mode, an assumed traveling load that is larger than the traveling load of each section is set as the traveling load of the section being currently traveled when the current traveling mode of the vehicle is the second mode, the traveling mode of the section having a relatively small traveling load including the assumed traveling load is planned to be the first mode and the traveling mode of the remaining section is planned to be the second mode.

6. A driving assist system for assisting driving of a vehicle which includes an internal combustion engine and an electric motor as a driving source based on one traveling mode that is selected from a plurality of different traveling modes, wherein the plurality of different traveling modes are traveling modes that are planned for each section obtained by dividing a traveling route of the vehicle from a current position to a destination, the driving assist system comprising:

a moving assist apparatus configured to plan one traveling mode that is selected from the plurality of traveling modes for each section of the traveling route, wherein the moving assist apparatus includes an electronic control unit configured to, for each section obtained by dividing a traveling route from the current position to the destination, plan one traveling mode from a first mode of not maintaining a charge storage amount of a battery and a second mode of maintaining the charge storage amount of the battery, based on a traveling load associated with the section, wherein the planning unit is configured to replan the traveling mode under a predetermined condition, and if a remaining distance or a remaining time of the section on which the vehicle is traveling is shorter than a respective threshold while the predetermined condition is satisfied, to replan a current traveling mode to be the traveling mode in priority.

* * * * *